Figure 1:
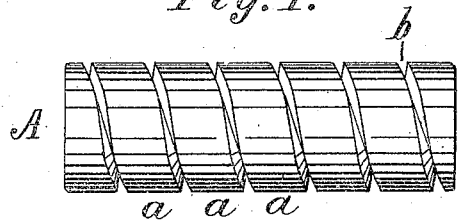

C. S. LOCKWOOD.
BEARING ROLL WITH ANGULAR INTERSPACE.
APPLICATION FILED AUG. 21, 1909.

950,110.

Patented Feb. 22, 1910.
2 SHEETS—SHEET 1.

Witnesses:
D. Goldklang
J. W. Greenbaum.

Inventor.
Charles S. Lockwood, per
Thomas S. Crane, Atty.

C. S. LOCKWOOD.
BEARING ROLL WITH ANGULAR INTERSPACE.
APPLICATION FILED AUG. 21, 1909.

950,110.

Patented Feb. 22, 1910.
2 SHEETS—SHEET 2.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

BEARING-ROLL WITH ANGULAR INTERSPACE.

950,110. Specification of Letters Patent. Patented Feb. 22, 1910.

Application filed August 21, 1909. Serial No. 513,972.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Bearing-Rolls with Angular Interspaces, fully described and represented in the following specification and the accompanying drawings, forming a part of the same.

This invention relates to roller bearings in which cylindrical rolls are used to sustain the load, and particularly to a cylindrical bearing-roll formed of spiral coils and having the coils wider at one edge than the other and the coils having a V-shaped spiral interspace between them proportioned and adapted to retain oil between the coils.

It is common at the present time to supply a lubricant to roller bearings to diminish the friction caused by the movement of the rolls and shaft within the casing; and it has been found that if the coils be wound in very close contact with one another they will operate gradually to press the oil toward the ends of the casing, leaving the middle portion destitute of lubrication; but if the coils be separated in a suitable degree, the spiral interspace between the coils serves as a reservoir of oil from which the oil is constantly distributed over different parts of the surface upon the shaft and casing. Such interspace will not, however, retain the oil if it be made too wide, and upon the contrary the oil will not be delivered from the spiral interspace if the same be so narrow as to produce an excessive capillary attraction for the oil.

The difficulty of securing an exactly proportioned interspace is wholly avoided by making the coils wider at one edge than the other so as to produce a wedge-shaped spiral interspace or groove upon the inner or outer side of the roll, the narrower portion of which serves to attract any oil over or through which the roll passes within the casing, while the wider portion of such interspace serves to carry the oil thus accumulated, until it is distributed in a spiral path upon the casing and shaft.

The supply of lubricant naturally accumulates in the bottom of the casing, and the rolls in their passage around the shaft pass through such lubricant and secure a supply of the same in the wedge-shaped grooves.

As a series of rolls is always used in a roller bearing, and the spiral interspaces of all the rolls traverse different parts of the casing and shaft, it is obvious that all parts are thus in turn effectively lubricated.

Figure 2:
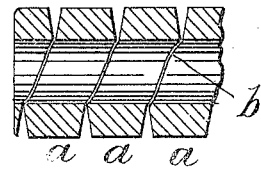
Figure 3:
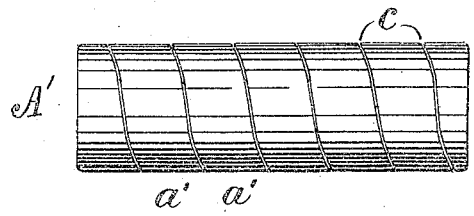
Figure 4:
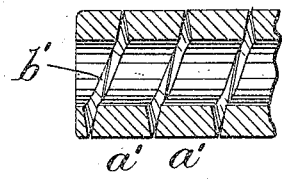
Figure 5:
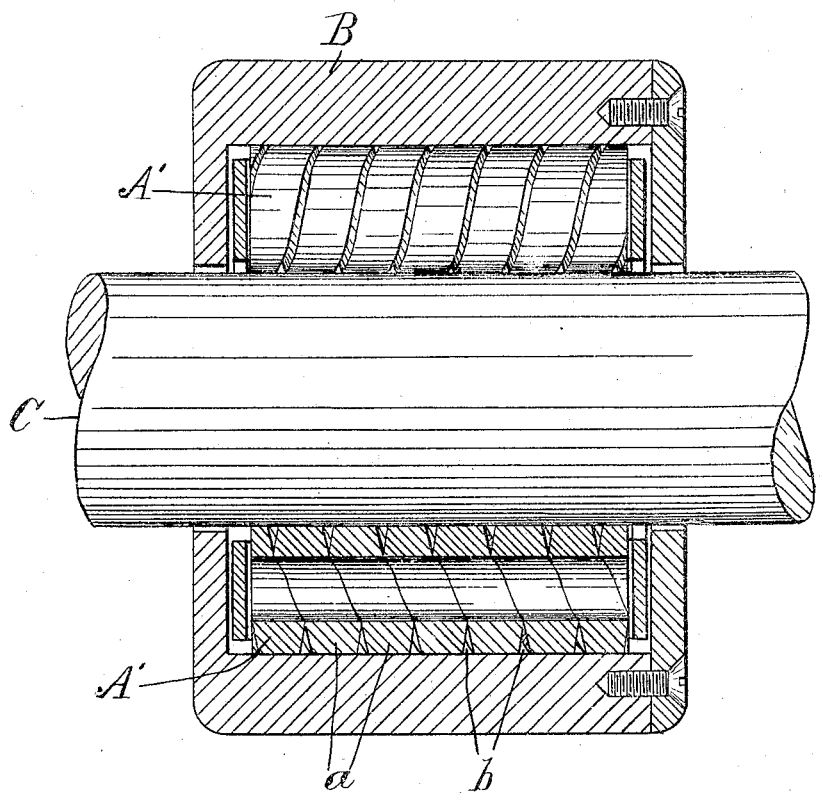

The annexed drawing shows embodiments of the invention, Figure 1 representing a side view of a roll having the groove or interspace widest upon its outer side; Fig. 2 is a longitudinal section of one end of such roll; Fig. 3 is a side view of a roll having the groove widest upon its inner side; and Fig. 4 is a longitudinal section of one end of such roll. Fig. 5 is a longitudinal section of the bearing containing such rolls and containing a shaft which is not shown in section.

In Fig. 5, B designates the casing of the roller bearing, C a shaft supported within the same, and A' designates the rolls having a V-shaped spiral interspace b' between the coils.

In Figs. 1 and 2, A designates the roll, and the coils a are shown narrowest upon the outer side, forming interspaces b which are quite narrow upon the inner side, and may, if desired, be in contact with one another, and of sufficient width upon the outer side to readily receive and distribute the oil as the roll moves in different parts of the casing.

In Figs. 3 and 4, A' designates the roll, and the strip a' is shown widest upon the outer side of the roll, thus forming the spiral interspace b' widest upon the interior of the roll; but the narowest portion of the interspace is left open sufficiently as shown at c in Fig. 3, to permit the distribution of oil which is accumulated in the widest part of the interspace. Such narrow portion of the interspace forms a capillary interspace which attracts any oil over which the roll passes and stores the same until delivered to some other part of the bearing. The discharge of oil from such inner interspace b' is facilitated by the rotation of the rolls, which produces a sufficient degree of centrifugal force to deliver the oil through the narrow outer interspace as the rolls pass over the surface of the shaft and casing.

The construction shown in Figs. 3 and 4 is preferable where a practically continuous surface is required, and in this form the advantages of the invention are secured without materially impairing the continuity of the surface of the roll.

Fig. 1 plainly shows the wider part of the spiral interspace $b$ upon the surface of the roll, and in this construction it has been found in practice that the interspace serves as a receiver and retainer for any dirt or similar substances which may find their way into the bearing, thus avoiding the grinding of such substances by the rolls, which operates to abrade and wear the rolling surfaces.

The coils in the rolls shown in the drawing which have a V-shaped interspace are necessarily of trapezoidal cross section, with the wider edges of the strip placed in contact, or separated by a capillary groove which is disposed upon the inner or outer side of the roll, as may be desired.

It is immaterial whether the rolls be cylindrical or of tapering form, as the V-shaped interspace operates the same in either case.

I am aware that in flexible shafts formed of spiral coils some deformation of the strip results in winding the strip into coils, but such a flexible shaft is not used to support a load upon its cylindrical sides and is not lubricated externally and does not in any sense operate like the cylindrical bearing-rolls claimed herein.

I hereby disclaim a flexible shaft made of deformed coils.

Having thus set forth the nature of the invention what is claimed herein is:

1. A cylindrical bearing-roll for a roller bearing having spiral coils wider at the inner than the outer edge, forming a V-shaped spiral groove upon the exterior of the roll adapted to retain and distribute oil.

2. The combination in a roller bearing, of a casing containing a set of spirally wound tubular bearing-rolls and a shaft supported thereby, the spiral coils of the rolls being wider at one edge than the other and the coils having a V-shaped spiral interspace between them proportioned and adapted to retain oil between the coils, and distribute it upon the shaft and casing.

3. The combination, in a roller bearing, of a casing containing a set of spirally wound tubular bearing-rolls and a shaft supported thereby, the spiral coils of the rolls having a trapezoidal cross section with their wider edges separated by a capillary interspace to permit the passage of oil between the coils, to and from the surface of the shaft and casing.

In testimony whereof I have hereunto set my hand in the presence of two subscribing witnesses.

CHARLES S. LOCKWOOD.

Witnesses:
J. W. GREENBAUM,
THOMAS S. CRANE.